INVENTOR
KEN-ICHIRO KURITA

United States Patent Office 3,251,472
Patented May 17, 1966

3,251,472
AUTOMATIC FILTER PLATE MOVING
APPARATUS IN A FILTER PRESS
Ken-ichiro Kurita, 35, 438 Oaza Senriyama, Suita,
Osaka Prefecture, Japan
Filed Jan. 16, 1963, Ser. No. 251,950
4 Claims. (Cl. 210—230)

This invention relates to an automatic filter plate moving apparatus in a filter press, more particularly to an apparatus in a filter press whereby filter plates are automatically moved one by one toward a movable head, so that filter cake sticking in filter cloth in each plate may be removed when the amount thereof comes to the saturation point. In a filter press of a known type, the process, done by hand, costs much labor and time, and besides, the filtering operation has to be suspended all that time, which lowers the filtering efficiency so much. Thus various kinds of apparatus for automatically moving filter plates one by one have been suggested so far, but few of them have proved fully to meet the requirements for their practical use.

Normally a filter press is furnished with a great number of filter plates, for example, from 50 to 150, and each of them is of considerable weight, so that an automatic moving apparatus for them should not only be able to move them correctly but also have a stout and durable structure capable of handling so many of them smoothly without bending to their enormous weight over a long term of its use.

The object of the present invention is to provide means of moving filter plates in a filter press one by one correctly and smoothly and besides, of giving the device for this a structure not only of sufficient durability but of comparatively moderate price.

With these objects in view, the present invention provides an automatic filter plate moving apparatus in a filter press, wherein each of a multitude of filter plates has an arm fixed thereto on either side. Each arm is slidably mounted on a side board furnished on either side of and in parallel with the row of the filter plates. A pair of screw shafts are furnished outside and in parallel with the side boards, adapted to be driven by a reversible electric motor at the same speed. A reciprocating member is threaded onto each screw shaft, adapted to reciprocate thereon corresponding to the direction of rotation of the screw shaft. Each reciprocating member is provided thereon with a pusher adapted to catch one of the filter plates by the arm and send it toward a movable head every time the reciprocating member makes its reciprocating motion, and a pair of limit switches is provided in each reciprocating member adapted to control the rotational direction of the reversible electric motor.

According to the present invention, filter plates in a filter press can be moved readily and correctly one by one through an apparatus durable and moderate in price.

Other and the further objects of the present invention will become apparent from the following specification and claims taken together with the accompanying drawings in which is shown the preferred embodiment of the automatic filter plate moving apparatus in a filter press according to the present invention.

Figure 1:
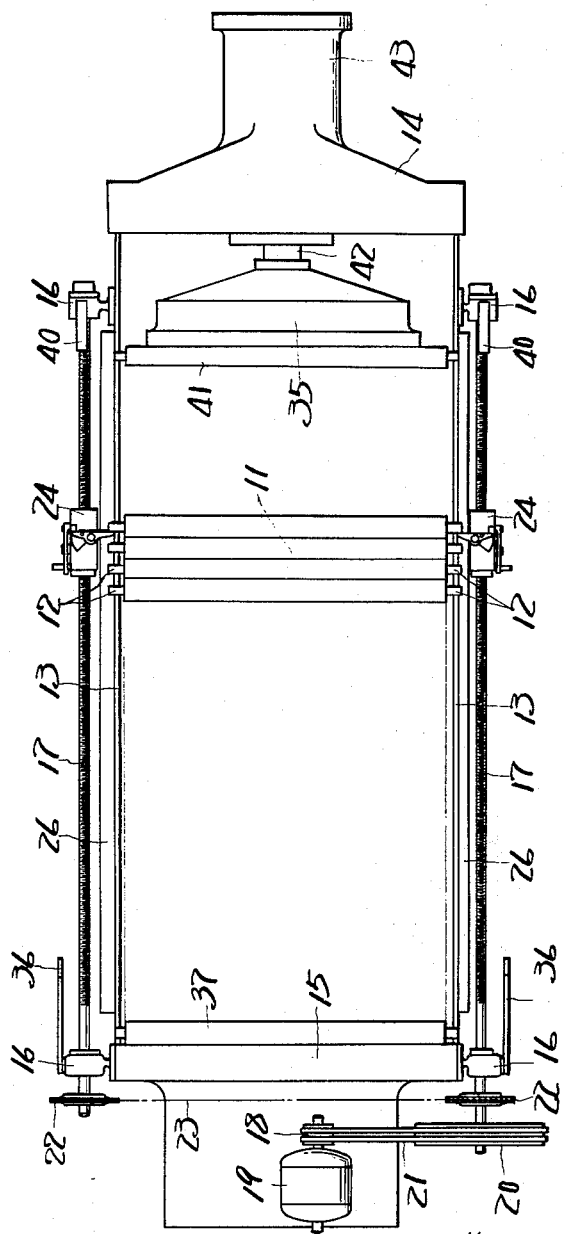
FIG. 1 is a general plan view of filter press embodying the present invention.

In these drawings reference numeral 11 indicates a filter plate, having on either side thereof an arm 12, which is half of the filter plate 11 in thickness and is slidably mounted on one of a pair of side boards 13, 13 fixed between a front frame 14 and a rear frame 15 in parallel with the row of filter plates 11. Near the ends of each side board 13 are brackets 16, 16 fixed thereto, holding screw shafts 17, 17 on either end in parallel with the side boards 13, 13. A pulley 18 furnished on a reversible electric motor 19 and a pulley 20 fixed to one of the screw shafts 17, 17 are connected by a belt 21, and sprocket wheels 22, 22 of an equal pitch circle fixed to the screw shafts 17, 17 are engaged with a chain 23, so that the pair of the screw shafts 17, 17 can be driven by the reversible electric motor 19 with the same speed.

Figure 3:
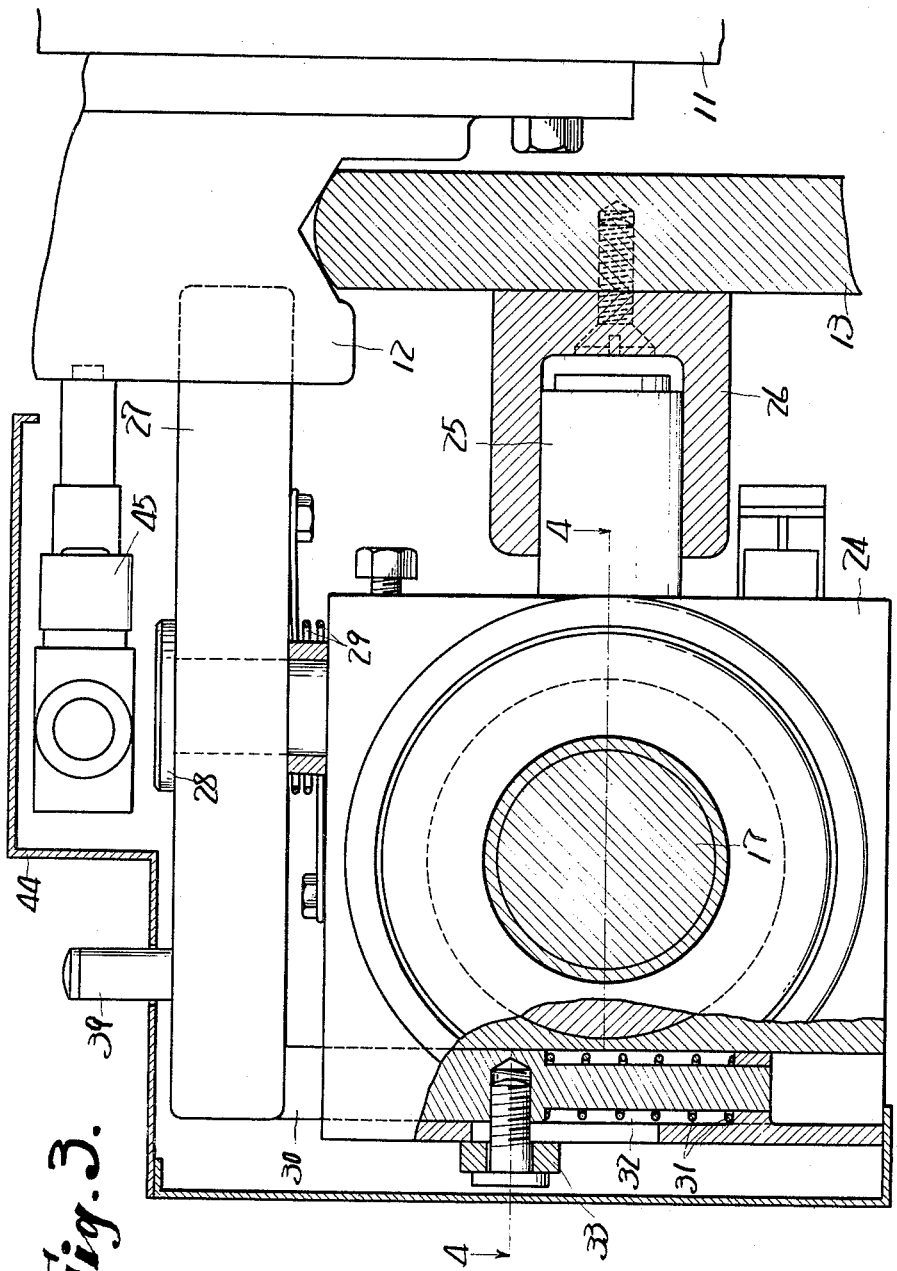
FIG. 3 is a sectional view of FIG. 2 on the line 3—3.

To each screw shaft 17 is movably screwed on a reciprocating member 24, which is provided with a roller 25 (FIG. 3) set in a guide 26 U-shaped in section and fixed to the outside of the side board 13, so that the reciprocating member 24 may move in lateral direction parallel with the side board 13 without a bit of rolling.

To the upper side of each reciprocating member 24 a pusher 27 having a level front side and a rounded backside is rotatably attached at the middle thereof with a screw 28, the outer end thereof being pressed by a spring 29 wound about the screw 28 upon a supporting piece 30 loosely inserted in an opening 31 bored in the reciprocating member 24 and pressed upward by a spring 32.

Figure 2:
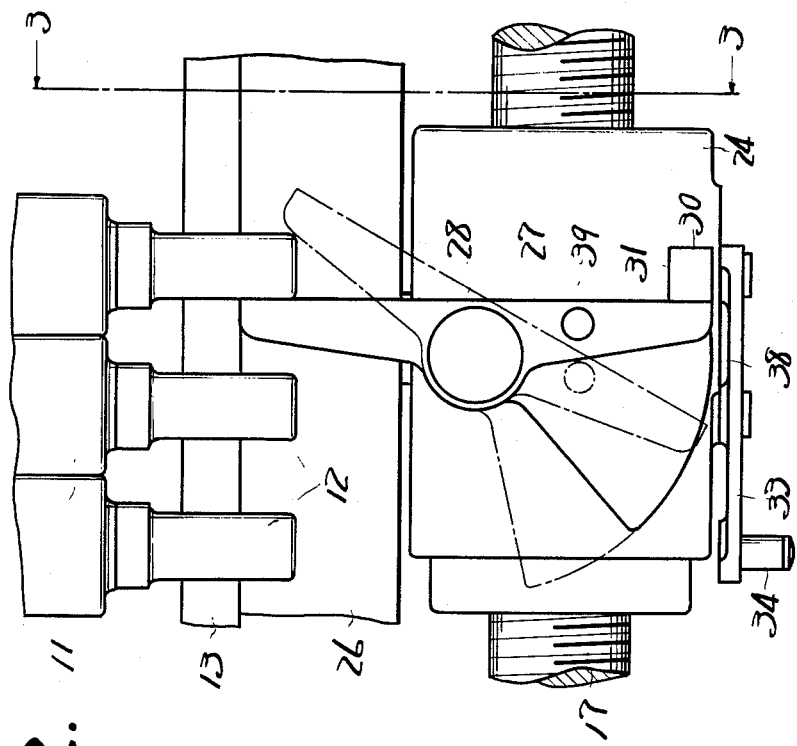
FIGS. 2 and 5 are enlarged plan views of a part of FIG. 1.

When the reciprocating member 24 goes back toward the rear frame 15, the pusher 27 is turned, as shown by the chain lines of FIG. 2, when inner end thereof is caught on the arm 12 of the filter plate 11, and just after the inner end has passed the arm 12 the pusher is turned in the opposite direction by the agency of the spring 29, which has been tensioned during rotation of the pusher 27, and gets into the gap between the said arm 12 and the adjacent arm 12. Then the electric motor is reversed in a manner to be described hereinafter, and when the reciprocating member 24 goes forward, it takes the filter plate 11 by the arm 12 and carries it toward a movable head 35. The stages of movement occur in exactly the same way and at the same time on the other side of the filter plate 11, too.

Figure 5:
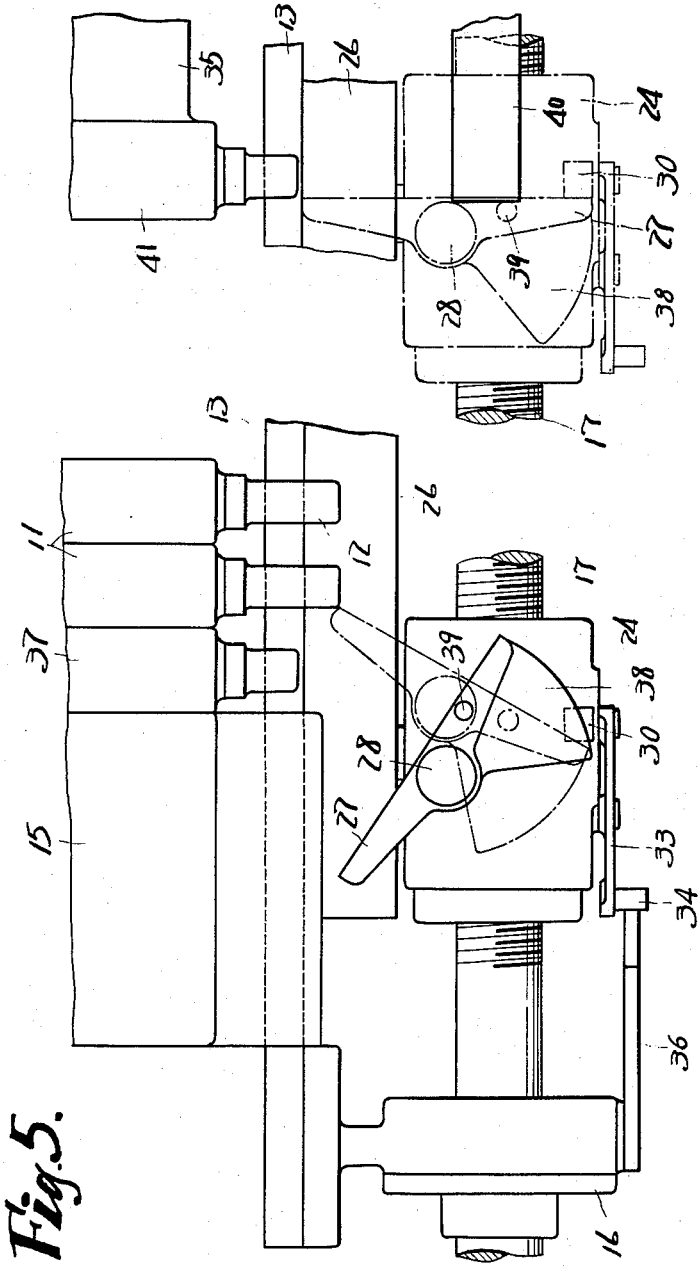

To the outer side of each reciprocating member 24 is attached a lever 33, and one end thereof is connected with the supporting piece 30, and the other end of the lever 33 is provided with a roller 34. On the outer side of each rear bracket 16 is fixed a beam 36 extending toward the roller 34. When all of the filter plates 11 have been moved toward the movable head 35 and then the reciprocating member 24 goes back past an end plate 37 fixed on the rear frame 15 (FIG. 5), the lever 33 turns by the co-operation of the roller 34 and an inclined surface of the beam 36 and the supporting piece 30 sinks into the opening 31, so that the pusher 27 turns as shown in FIG. 5. In this operation the supporting piece 30 being kept in the lowered position by a sector plate 38 fixed to the pusher 27, the pusher is kept in the forwardly rotated position. Therefore the arms 12 of the filter plates 11 are not struck by the pusher 27 as it passes them and electric motor is reversed and the reciprocating member 24 moves toward the movable head 35. On the upper side of each pusher 27 is provided a pin 39 a little to the outside of the fulcrum, and on the upper side of each front bracket 16 is fixed a stopper 40. When the reciprocating member 24 comes up to the neighborhood of an end plate 41 fixed on the movable head 35, the pin 39 knocks against the stopper 40, and the pusher 27 turns back to the operating position.

The movable head 35 is fixed to a ram 42 of a pressure oil cylinder 43 furnished in the front frame 14. When all the filter plates 11 have been moved toward the movable head 35, they are returned to the former position, that is, their filtering position by the agency of the ram 42, together with the movable head 35.

The means for bringing about reciprocal movement of the members 24 will now be described. To each reciprocating member 24 is fixed a frame 44, provided with a pair of limit switches 45, a front limit switch and a rear limit switch, only the rear limit switch being shown in FIG. 3.

Figure 4:
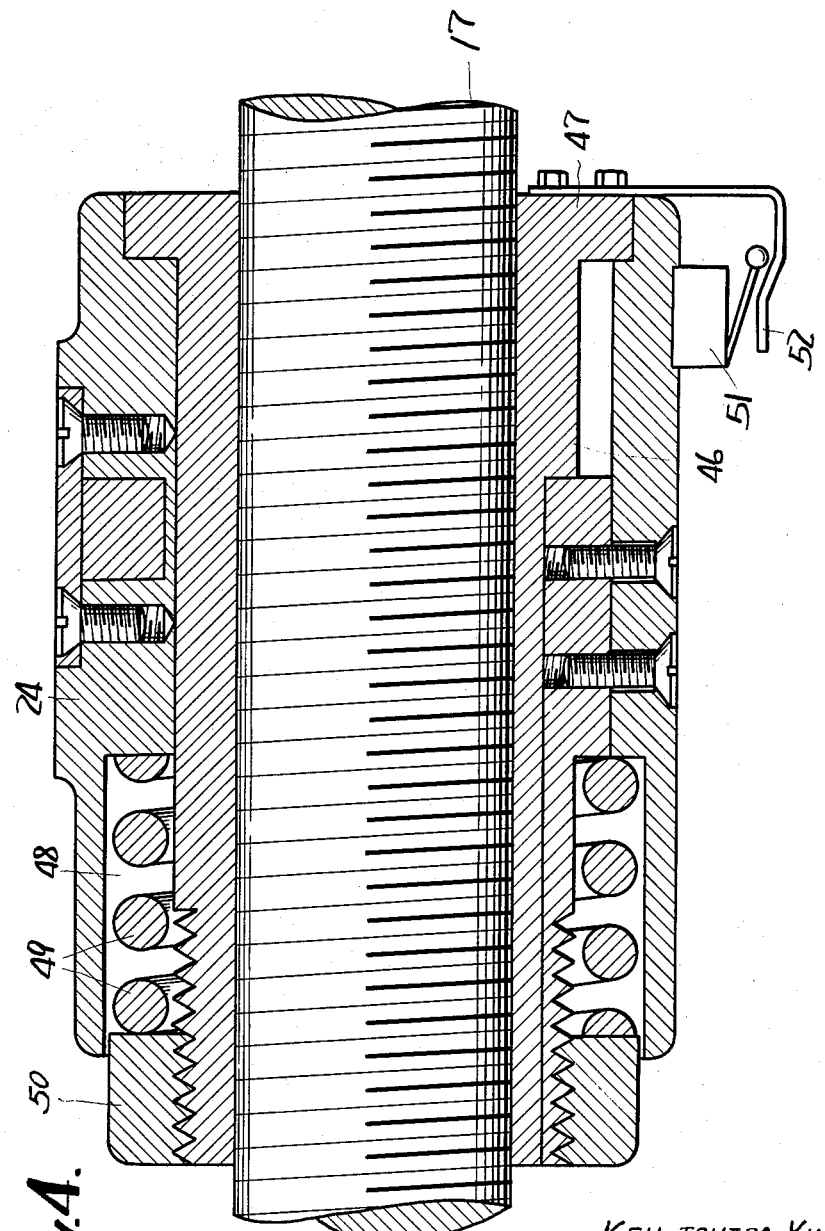
FIG. 4 is a sectional view of FIG. 3 on the line 4—4.

In each reciprocating member 24 is movably inserted a sleeve 46 which has a flange 47 on one end and a screw engaging with the screw shaft 17 inside, and in a recess 48 cut on the reciprocating member 24 at the other end thereof is set a buffer spring 49, as shown in FIG. 4. To a screw cut outside the sleeve 46 on that end is screwsd on a nut 50 wheron is held the outer end of the spring 49. One the upper side of the reciprocating member 24 is furnished a limit switch 51, and on the side of the flange 47 of the sleeve 46 is furnished a contact maker 52 for the limit switch 51. When each reciprocating member 24 goes backward, after the end of pusher 27 moves between arms 12, the rear limit switches 45 engage the arm 12 of the first filter plate 11, and direction of the reversible electric motor 19 is changed by the limit switch. When the reciprocating member 24 goes forward by the action of the now reversed electric motor, taking one of the filter plates 11 by the arm 12 and the filter plate 11 comes into contact with the end plate 41 or the preceding filter plate 11 which has already been moved, the front limit switch 45 engages said end plate or preceding filter plate and the reversible electric motor 19 changes its direction of rotation back to its initial direction. During this action, if the shock of the reciprocating member is too great, the limit switch 51 operates so as to stop the reversible motor 19.

In a filter plate moving apparatus according to the present invention, the recprocating member 24 on each side of the press is placed between the first filter plate 11 and the end plate 41 before filtering operation. When the operation is finished, the reversible electric motor 19 is switched on and the pair of reciprocating members 24, 24 go backward, the pushers 27, 27 thereof pass the arms 12, 12 of the first filter plate 11 and get into the gap between the arms of the first filter plate 11 and those of the adjacent one 11, and just at that moment the rear limit switches 45, 45 engage the arms 12, 12 of the first filter plate 11 respectively and reverse the electric motor, the reciprocating member 24, 24 go forward taking the first filter plate 11 with them toward the movable head 35, the arms 12, 12 caught by the front sides of the pushers 27, 27. When the first filter plate 11 knocks against the end plate 41 attached to the movable head 35, the front limit switches 45, 45 work, the reversible electric motor 19 changes its direction and the reciprocating members 24, 24 begin to go backward. The process repeated until all the filter plates 11 have been sent toward the movable head 35, the pressure oil cylinder 43 works and returns the filter plates 11 to their former position by means of the movable head 35. When the rollers 34, 34 move on the inclined surface of the beams 36, 36 at the end of the last backward movement of the reciprocating members 24, 24 the supporting pieces 30, 30 sink, the pushers 27, 27 turn, and the rear limit switches 45, 45 are brought into contact with the arms 12, 12 of the end plate 37. Then motor again reverses and the reciprocating members 24, 24 begin to go forward. When the pins 39, 39 knock against the stoppers 40, 40, the pushers 27, 27 turn and come back to their former working position, and at the same time the front limit switches 45, 45 working, the reciprocating members 24, 24 begin their backward movement. Then the reversible electric motor 19 is switched off and the revolution thereof stops.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

Having thus described my invention, what I claim and desire to secure by Letters Patent of the United States is:

1. An automatic filter plate moving apparatus for a filter press having a plurality of filter frames slidably mounted on side rails between a fixed end plate at one end of the filter frames and a movable end plate at the other end of the filter frames, said moving apparatus comprising a pair of parallel screw shafts on opposite sides of the plurality of filter frames, a reversible motor coupled to said screw shafts for driving said shafts, a pair of reciprocating members, one mounted on each shaft and having means thereon for engaging the filter frames and moving them in a direction toward the movable end plate and moving past the filter frames without engaging them when moving away from the movable end plate, limit switch means on at least one of said reciprocating members coupled to said reversible motor and engageable with the filter frames and end plates for reversing the motor when the reciprocating member has engaged a filter frame or one of the end plates; a release means on each reciprocating member for releasing said engaging means, a cam means at the end of said apparatus adjacent said fixed end plate and engageable by the release means for releasing said engaging means so that said engaging means does not engage the filter frames, and a first stop means at the other end of the apparatus adjacent the movable end plate and engageable by the engaging means for returning said engaging means to the filter frame engaging position, whereby the reciprocating member will automatically reciprocate back and forth and move individual filter frames from a position at the end of the plurality of frames against the fixed end plate to a position against the plurality of frames against the movable end plate until all of the filter frames have been moved and then the reciprocating member will move along the stack of filter frames without engaging them to the movable end plate at which said reciprocating members will be reversed to start the automatic reciprocating movements again.

2. An automatic filter plate moving apparatus as claimed in claim 1 in which the filter frames have arms thereon projecting laterally thereof, and said engaging means comprises a lever pivotally mounted on each of said reciprocating members and adapted to have one end thereof engaged with an arm on a filter frame when the lever is perpendicular to the direction of movement of the reciprocating members, first spring means urging the end of said arm engageable with the filter frames out of engagement with the filter frames in a direction toward the fixed plate of the filter apparatus, and second stop means on the reciprocating member blocking movement of the lever past the said perpendicular position in said direction toward said movable end plate, whereby the lever on each reciprocating member can pivot so that it moves out of the path of the arm on each filter frame as the reciprocating members move past the filter frame in a direction toward the fixed end plate and then springs back to the perpendicular position for engagement with the arm of the filter frame over which it has just moved.

3. An automatic filter plate moving apparatus as claimed in claim 2 in which said second stop means is movable into and out of the path of said lever, and said release means comprises a second spring urging said second stop means into the path of said lever and a stop moving member coupled to said second stop means and having a projection engageable with said cam means for moving said second stop means out of the path of said lever.

4. An automatic filter plate moving apparatus as claimed in claim 3 in which said second stop means is movable perpendicular to the plane of movement of said lever and said lever has a sector plate thereon, said cam moving said second stop means out of the path of the lever and the first spring means engaged with the lever moving the lever past the position of the second stop means so that the sector plate engages the end of the second stop means and prevents the second stop means from moving back into the path of the lever, and said first stop means adjacent the movable end plate engages the lever and swings it back out of the path of the second stop means and the second stop means is urged into the path of the lever by the second spring engaged with the second stop means.

References Cited by the Examiner

UNITED STATES PATENTS

| | | | |
|---|---|---|---|
| 353,514 | 11/1886 | Swenson | 210—230 X |
| 672,505 | 4/1901 | Critchlow | 210—230 |
| 1,390,531 | 9/1921 | Lockwood | 210—230 X |
| 2,604,184 | 7/1952 | Warburton et al. | 55—118 X |
| 2,949,845 | 8/1960 | Kurits | 100—198 |
| 3,055,224 | 9/1962 | Macgeorge | 74—665.04 X |

FOREIGN PATENTS

| | | |
|---|---|---|
| 526,983 | 7/1921 | France. |
| 204,566 | 11/1908 | Germany. |

REUBEN FRIEDMAN, *Primary Examiner.*

ROBERT F. BURNETT, *Examiner.*